United States Patent [19]

Sesona et al.

[11] Patent Number: 5,481,963
[45] Date of Patent: Jan. 9, 1996

[54] AUTOMATED PANCAKE MAKER

[76] Inventors: Albert J. Sesona, 7731 Manassas Ct., N., Jacksonville, Fla. 32277; Ernesto E. Blanco, 36 Sandrick Rd., Belmont, Mass. 02178

[21] Appl. No.: 426,706

[22] Filed: Apr. 24, 1995

[51] Int. Cl.⁶ .............................. A47J 37/06; A47J 37/10
[52] U.S. Cl. ................. 99/335; 99/353; 99/373; 99/423; 99/427; 99/448
[58] Field of Search .......................... 99/325, 331–335, 99/353–355, 373–380, 422–424, 426, 427, 432, 448, 395; 219/200, 445, 462, 464, 465, 524, 525

[56] References Cited

U.S. PATENT DOCUMENTS

| | | | |
|---|---|---|---|
| 2,830,529 | 4/1958 | Jaffe | 99/423 |
| 2,861,524 | 11/1958 | Peralta | 99/423 |
| 3,092,014 | 6/1963 | Macchi | 99/423 |
| 3,349,724 | 10/1967 | Tavan | 99/423 |
| 3,349,726 | 10/1967 | Fono | 99/423 |
| 3,593,652 | 7/1971 | Lostanien | 99/423 |
| 3,683,150 | 8/1972 | Kehl et al. | 219/200 |
| 3,718,487 | 2/1973 | Brunner | 99/353 |
| 3,814,006 | 6/1974 | Giraud | 99/443 R |
| 3,961,567 | 6/1976 | Munier | 99/355 |
| 4,583,451 | 4/1986 | Kanagy | 99/395 |
| 5,320,030 | 6/1994 | Hubbard | 99/448 |

*Primary Examiner*—Timothy F. Simone
*Attorney, Agent, or Firm*—Arthur G. Yeager; Earl L. Tyner

[57] ABSTRACT

An electric pancake maker having a liquid batter container that is thermally protected; a metering pump system arranged to dispense separate, equal portions of batter simultaneously onto a first cooking surface assembly including a plurality of concave cooking dishes; a heated smooth faced second cooking surface assembly; a mainshaft arrangement connecting both cooking surface assemblies; and means to pivot those surfaces through half circle travel about the mainshaft to flip partially cooked pancakes from one surface to the other, and ultimately discharge fully cooked pancakes in an automated manner.

5 Claims, 10 Drawing Sheets

AUTOMATED PANCAKE MAKER

BACKGROUND OF THE INVENTION

This invention relates to an apparatus for automatically cooking, flipping, monogramming and discharging a plurality of pancakes, periodically or continuously.

DESCRIPTION OF THE PRIOR ART

The preparation and production of pancakes has been and continues to be, for the most part, labor intensive. Most food establishments buy dry batter flour mix in large bulky sacks which require heavy lifting and proper storage to deter contamination and/or degradation. Portioning and liquifying of the batter mix is generally accomplished manually.

Pancakes require much higher temperatures than do other grille cooked foodstuffs and thus adds nuisance variables. For instance if a chef is limited to the use of a single grille, a sizable area of this cooking surface must be raised in temperature approximately 100° to accommodate pancake preparation. This procedure is very inconvenient and costly because once the required amount of pancakes have been prepared, cooking temperatures must be returned to former settings. In many restaurants where the cooking grille surface is zealously guarded, pancakes are not served. In other restaurants that offer pancakes as a standard menu item, two independent cooking grilles are maintained; one kept at a higher than normal temperature exclusively for pancake preparation.

Regardless of method chosen, upon reviewing industry-wide food server needs and the exceptionally high-profit potential of pancakes, one quickly recognizes the desirability of an apparatus capable of eliminating the usual fuss and mess of pancake production.

Many inventors in the past have attempted to introduce such an apparatus, one of the first being Jaffe, U.S. Pat. No. 2,830,529, disclosing a machine for automatically cooking pancakes. Constructed with its batter storage hopper/meter valve assembly located directly above the two hot cooking grilles exposes these component parts to the harmful effects of upward rising heat, which dehydrates and partially cooks the liquid batter content, making it putty-like, as a result the flow rate from the batter container is inconsistent; the flow rate through the meter-valve assembly is inconsistent; the batter deposit onto the first cooking grille is partially cooled; and the cooking time from pancake to pancake varies.

It is an object of this invention to provide a novel pancake maker. It is another object of this invention to provide a superior system which satisfies the stringent demands normally associated with pancake preparation, and is fully automated to cook, flip, and eject a plurality of pancakes simultaneously. Still other objects will appear in the more detailed description found below.

BRIEF DESCRIPTION OF THE INVENTION

This invention relates to an automated pancake maker having a continuous operating cycle and comprising a first heated cooking surface including a plurality of heated pancake cooking dishes in an original horizontal position, a second heated cooking surface pivotally attached to said first cooking surface, a container for holding liquid pancake batter, means for automatically supplying a selected amount of said batter to each of said pancake dishes at a selected starting time; timed means for pivoting said second cooking surface from its original horizontal position onto the tops of cooking pancakes on said cooking dishes; means to lock said first cooking surface to said second cooking surface with said cooking pancakes between said two surfaces and to pivot said two surfaces reversely until said second cooking surface returns to its original horizontal position; means for unlocking said first cooking surface from said second cooking surface and pivoting said first cooking surface reversely to its original horizontal position and adapted to repeat another cycle; timed means for tilting said second cooking surface into an inclined plane to enhance removal of fully cooked pancakes therefrom and means to return said second cooking surface to its original horizontal position ready to begin the next said cycle.

In one specific and preferred embodiment the means for automatically supplying a selected amount of batter includes a flexible rubber tubing extending from the container to an exit spaced above each pancake dish, a cam surface selectively positionable against the rubber tubing adjacently upstream from the exit, a plurality of rollers to bear against the rubber tubing and a cam squeezing the rubber tubing, and a motor to rotate the rollers against the tubing and to dispense the batter out the exit like toothpaste.

In another preferred embodiment the means for pivoting the second cooking surface to the tops of the cooking pancakes includes gravity acting on an elevated weight to cause it to fall a given distance.

In still another preferred embodiment, means to pivot both cooking surfaces in a reverse direction to return the second cooking surface to its original horizontal position and to pivot the first cooking surface back to its original horizontal position and includes a motor turning a sprocket wheel via a crank arm and the sprocket wheel driving a belt that pivots the first cooking surface.

In still another preferred embodiment the means for tilting the second cooking surface includes a motor with a lever arm assembly and a pad at the free end of the lever arm assembly, with the lever arm assembly adapted to extend the pad upwardly under one end of the second cooking surface.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE APPARATUS

Figure 1:
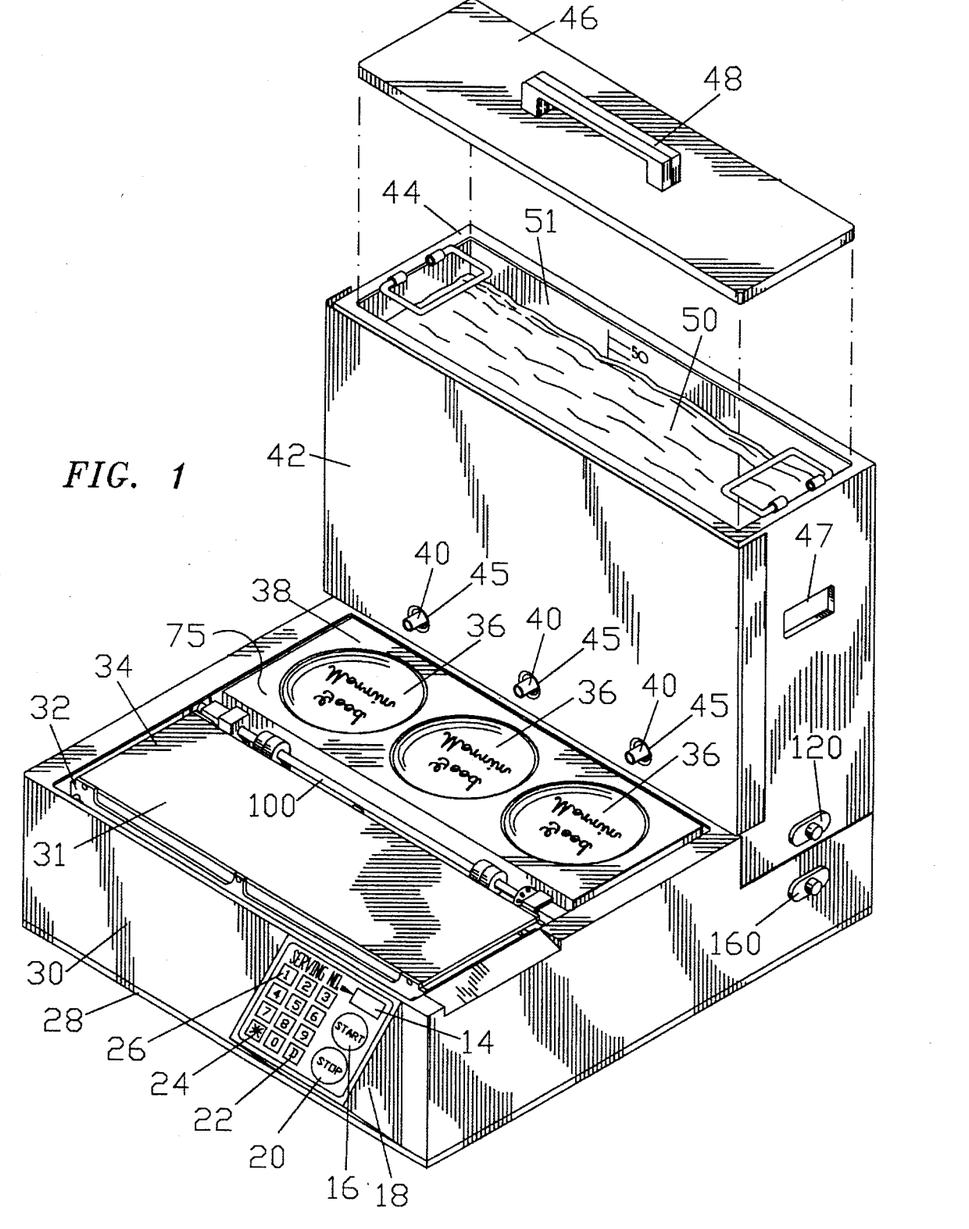
FIG. 1 is an isometric view of the apparatus that best shows exterior component parts in place and numbered accordingly.

Referring directly to FIG. 1 there is shown an isometric drawing of an electro-mechanical apparatus embodying constructions, arrangements and combinations herein described and claimed of said invention comprising a horizontal support housing 30 combined with baseplate 28 and adapted to be mounted at an operable elevation above floor level. Horizontal support housing 30 is removably attached to baseplate 28 by a prior art quick-disconnect latch means 160 located on both left and right sides adjacent to the rear corners.

At a point adjacent to the front righthand corner of horizontal support housing 30 is located an electric pushbutton control console 18 consisting of a typical 12-key digital layout which includes special function keys 22 and 24, START pushbutton 16, STOP pushbutton 20 and window 14 showing number of servings ordered and in preparation.

Again referring to FIG. 1 there is a vertical support housing 44 having a top entry cover 46 and cover handle 48. Vertical housing 44 is removably attached to horizontal support housing 30 by another prior art quick-disconnect latch means 120 (similar to 160) at right and left sides adjacent to the rear corners. Pocket handgrips 47 also on left and right sides of vertical support housing 44 provide convenient means to lift and remove it when latches 120 are unlocked. At required locations on the lower front face of vertical support housing 44 are three portholes 45 of appropriate size to allow the passage of three flexible rubber delivery tubes 40 from the batter container (not shown) to the exit as shown above cooking plates 36. A first cooking surface assembly 38 is made up of dishes 36, cover plate 75 surrounding those dishes, and the supporting framework 68 (described in connection with FIG. 11).

Various inscribed or special shaped Teflon coated cooking dishes 36 can be maintained for speedy replacement to fit special occasions.

Figure 11:
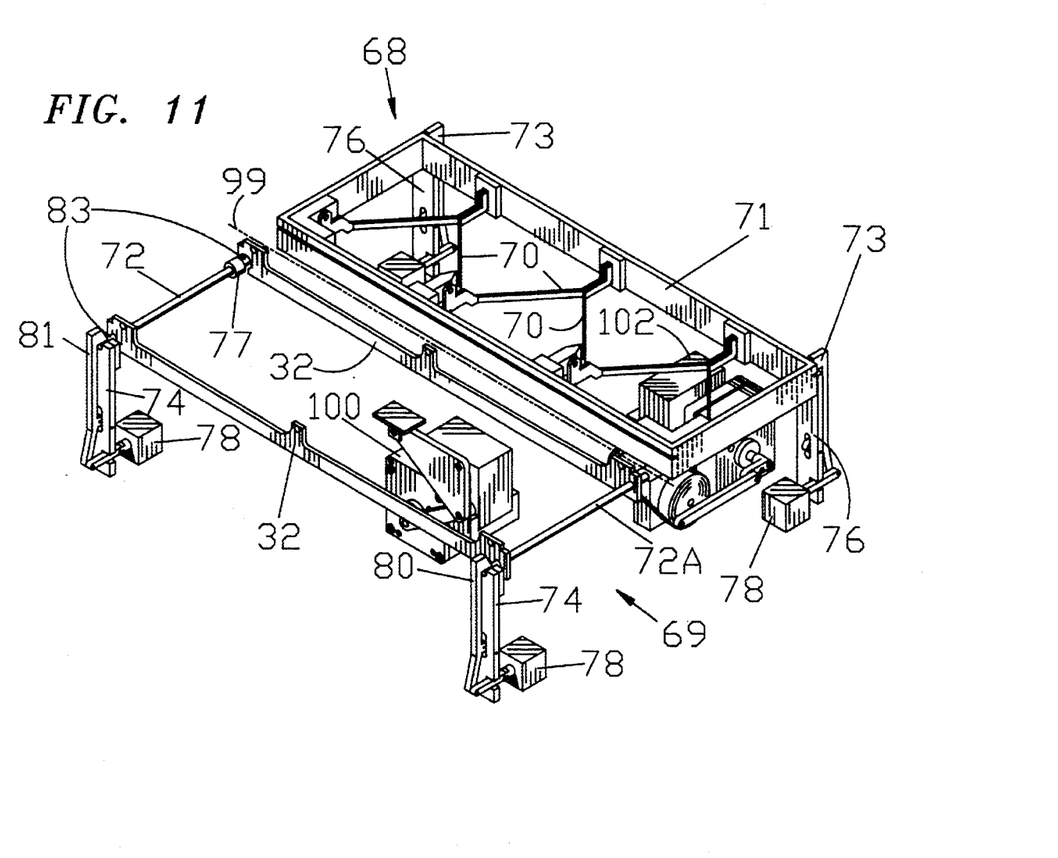
FIG. 11 is an isometric view of the supporting framework for first and second cooking surfaces, but omitting the shaft assembly of FIG. 13.

Immediately adjacent to first cooking surface assembly 38 and also horizontal in posture is a flat planar Teflon coated second cooking surface assembly 34 as illustrated in FIG. 1. Its underside supporting framework 69 is detailed in FIG. 11, showing struts 32, pivot arms 72 and arm latch 77. Second cooking surface assembly 34 is smooth faced to best assist discharging fully cooked pancakes 37 therefrom. Between first and second cooking surface assemblies 38 and 34 is main shaft 100 (described with respect to FIG. 13) which provides the means for flipping pancakes from one surface to another.

Figure 2:
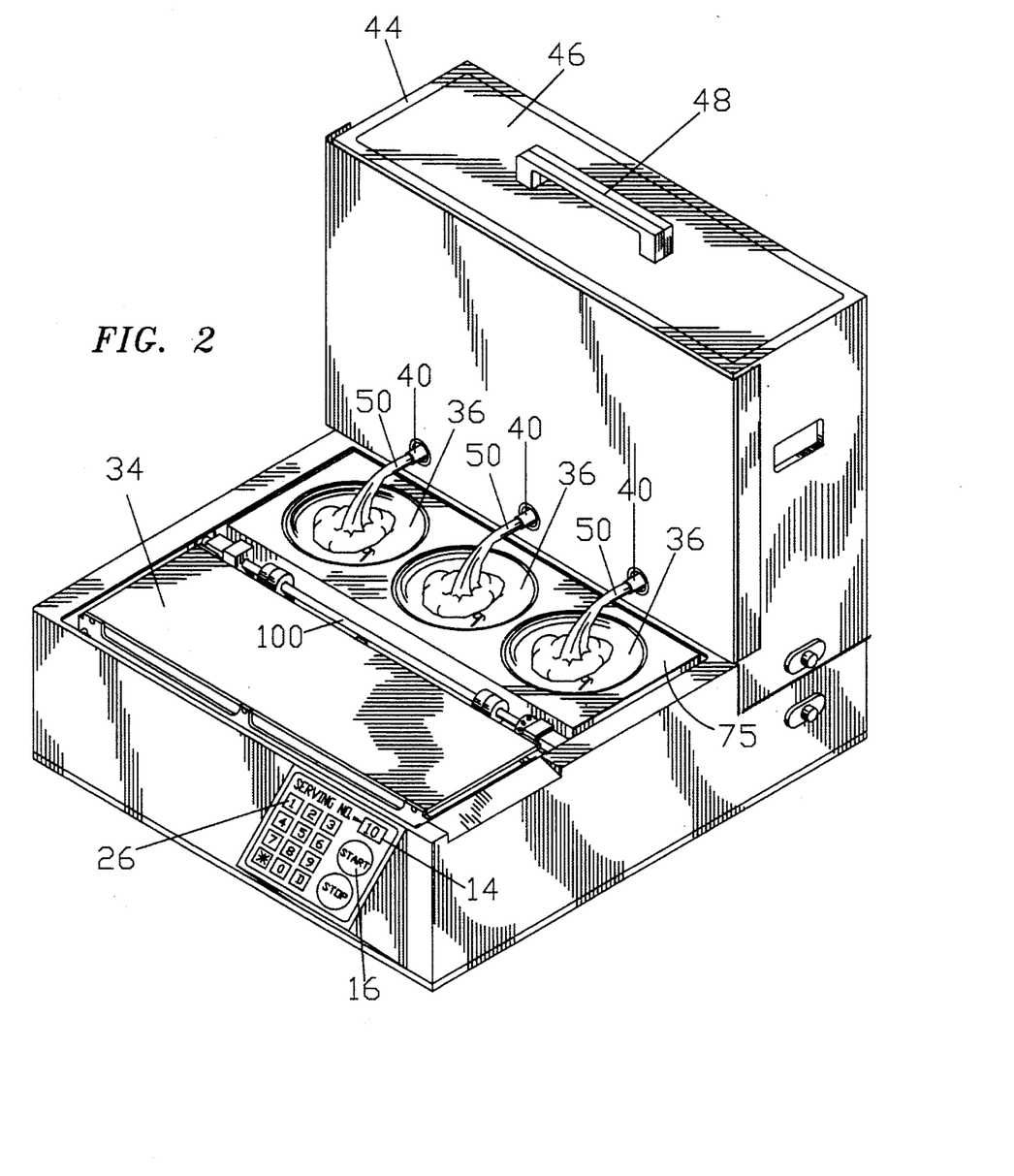
FIG. 2 is a similar isometric view showing liquid batter mix being dispensed through three flexible rubber delivery tubes directly onto cooking dishes on the first cooking surface assembly.

Now referring to FIG. 2 illustration shows three separate portions of liquid batter mix 50 exiting three flexible rubber delivery tubes 40 and being dispensed directly onto three cooking surface dishes 36, simultaneously. The dishes 36 receive and hold the liquid batter mix until pancakes are cooked on their bottom faces.

Figure 3:
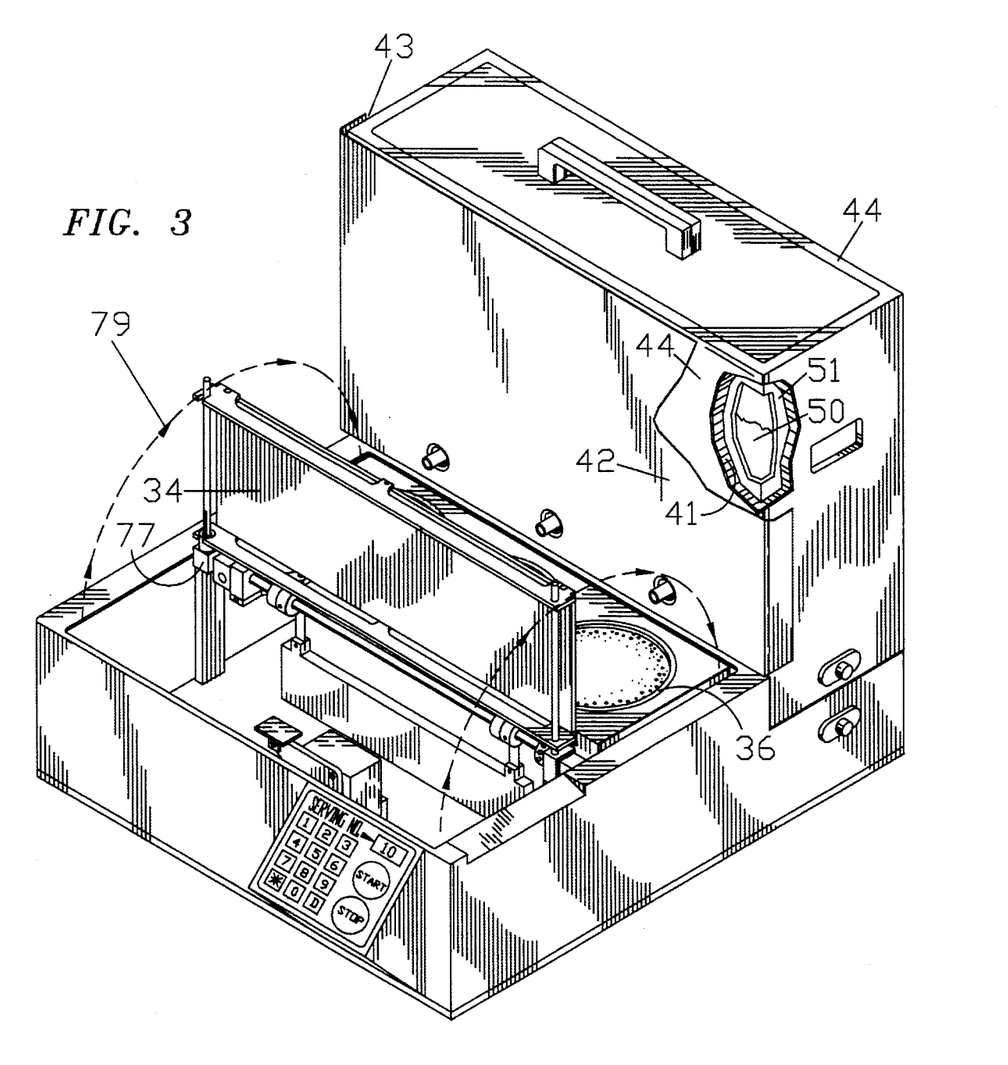
FIG. 3 is another isometric view similar to FIGS. 1 and 2 showing the second cooking surface at the mid-point of its half-circle travel path enroute to contacting the partially cooked pancakes on the first cooking surface.

FIG. 3 illustrates the heat baffleplate 42 with approximate ¼ inch air space 43 between it and thermal insulation cover 41 applied to the entire inner wall face of vertical support housing 44. Inside of housing 44 is a removable container 51 filled with liquid batter mix 50. This combination is designed to minimize the detrimental effects of upward rising heat and overall heat transfer from adjacent cooking surfaces 38. FIG. 3 also illustrates second cooking surface assembly 34 poised vertically at mid-point of its half-circle travel path 79 (indicated by dashline) on its way to contact the top uncooked surface of the pancakes cooking in dishes 36.

Figure 4:
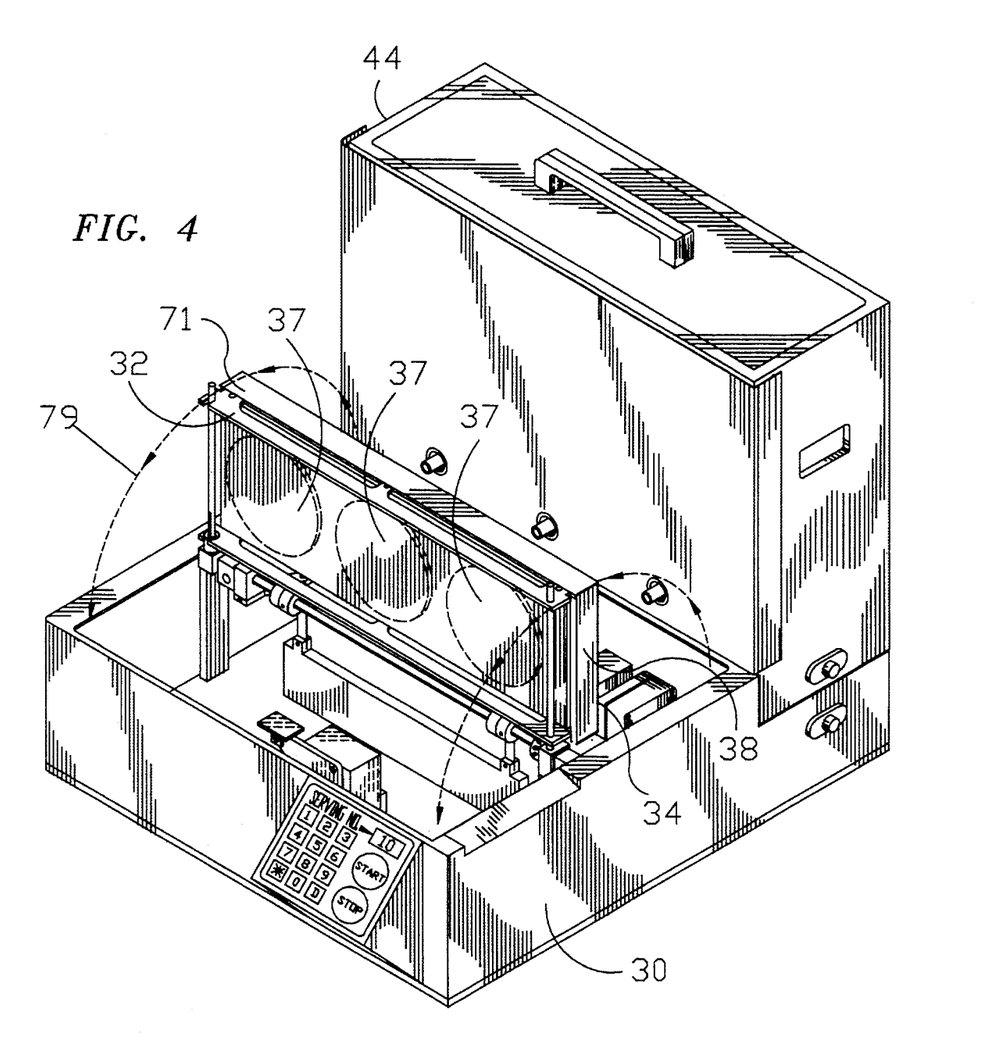
FIG. 4 is another isometric view similar to FIGS. 1–3 showing the first and second cooking surfaces united at mid-point of a half-circle travel path having three half-cooked pancakes between the two cooking surfaces in the process of being flipped and transferred from one cooking surface to the other.

FIG. 4 illustrates second cooking surface 34 joined to first cooking surface 38 with cooking pancakes securely sandwiched between the two surfaces and half way returned to the original horizontal position of second cooking surface 34 as indicated by dashline 79.

Figure 5:
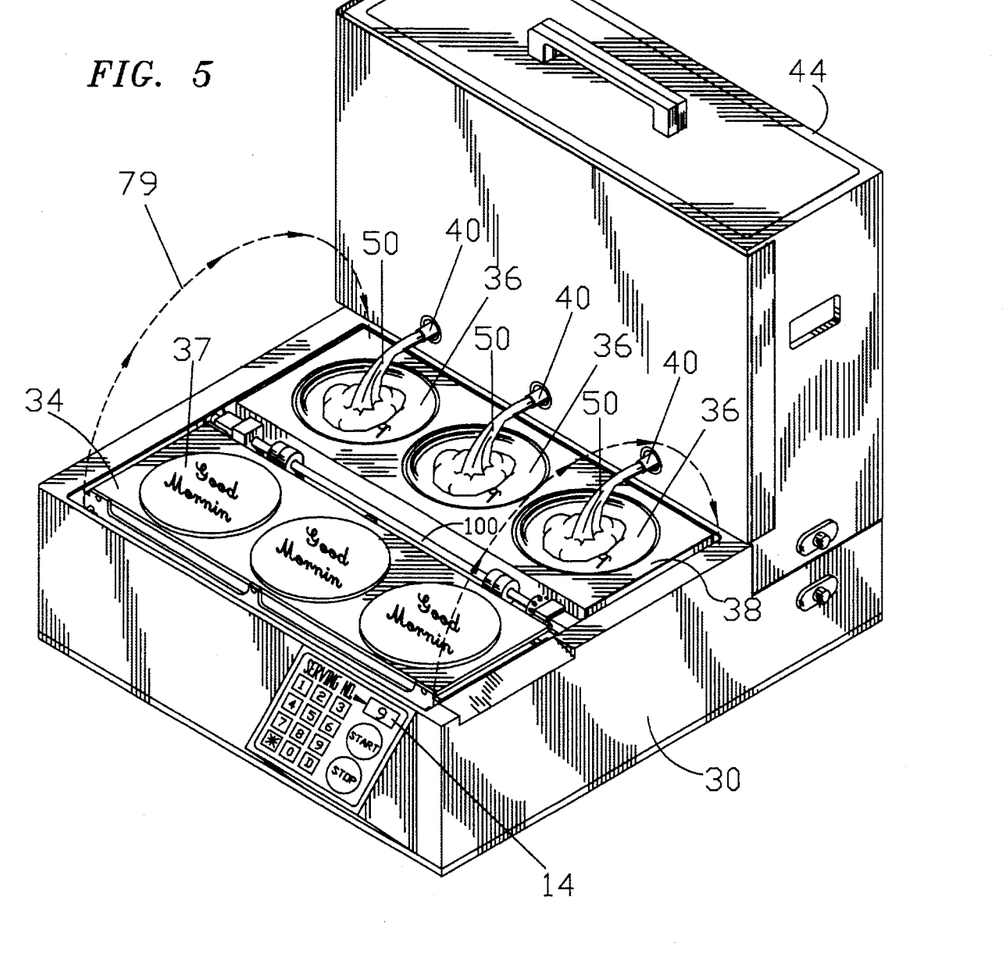
FIG. 5 is another isometric view similar to FIGS. 1–4 showing flipped over pancakes cooking on the second cooking surface, and the next cycle beginning with liquid batter mix being poured onto the cooking dishes as in FIG. 2.

FIG. 5 illustrates second cooking surface assembly 34 returned to its original horizontal position firmly anchored by latches 80 and 81 (FIG. 11) and with three-partially cooked pancakes 37 successfully flipped for finish cooking of their topsides. Also, first cooking surface assembly 34 is once again at its original horizontal starting position, firmly anchored by latches 73 (FIG. 11) and being filled with batter for the next cooking cycle. Since the apparatus had been programmed for ten servings, with three portions previously dispensed, window 14 indicates that nine servings remain.

Figure 6:
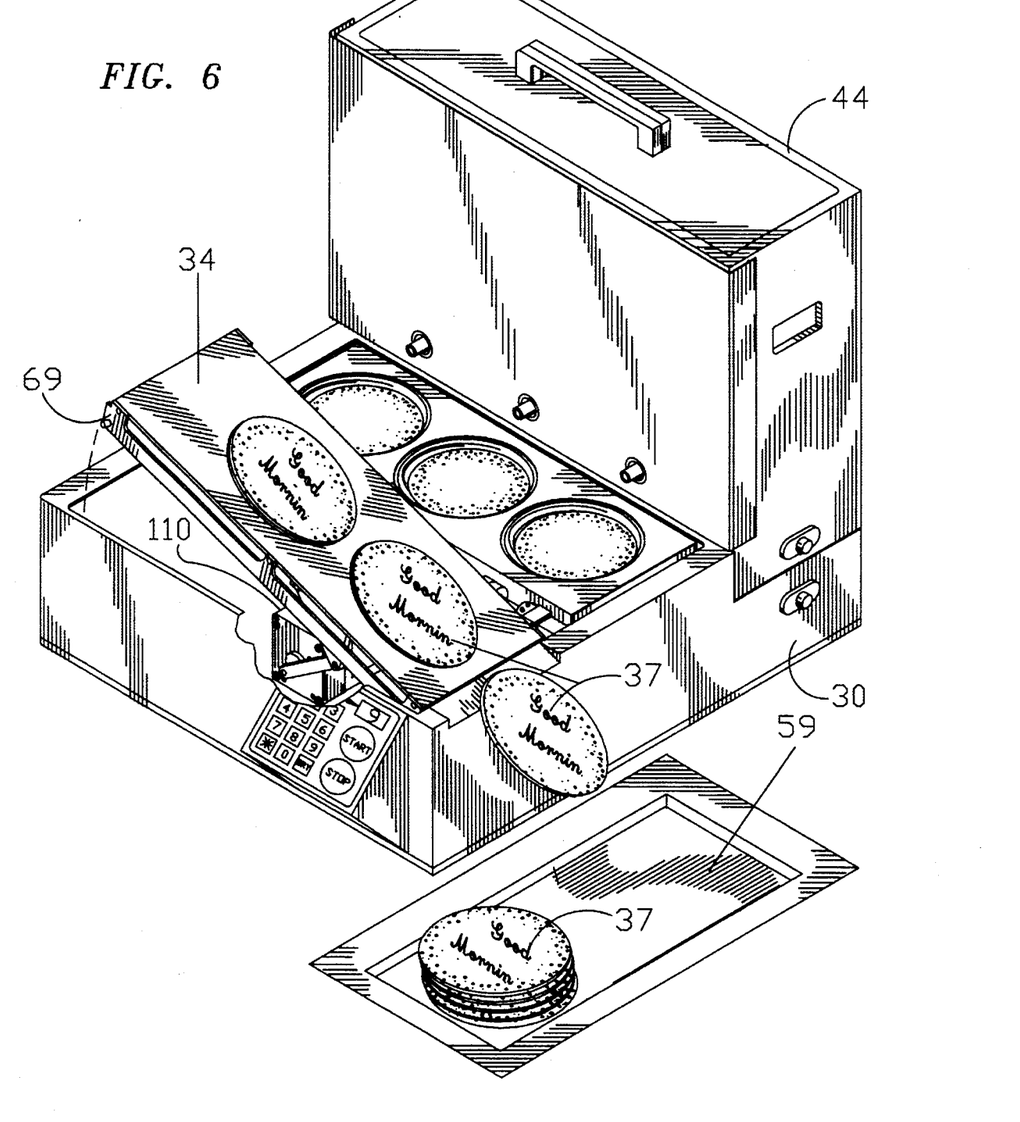
FIG. 6 is another isometric view similar to FIGS. 1–5 showing fully cooked pancakes being ejected from the second cooking surface after it has been tilted.

FIG. 6 illustrates the second cooking surface assembly 34 with one end being lifted upwardly to cause the three fully cooked pancakes 37 to slide into receptacle 59. This becomes possible when latch 81 (FIG. 11) is released and latch 80 (FIG. 11) is not, allowing motor 110 and its lever assembly 111 and 112 to raise the second cooking surface 34 and its supporting framework 69. Other arrangements can be employed than motor 110 with levers 111 and 112 to tilt second cooking surface 34. If there is an undue amount of sticking of pancakes 37 to surface 34, it may be necessary to add a scraping means or the like to release pancakes 37 to slide down the inclined surface.

Figures 7, 8:
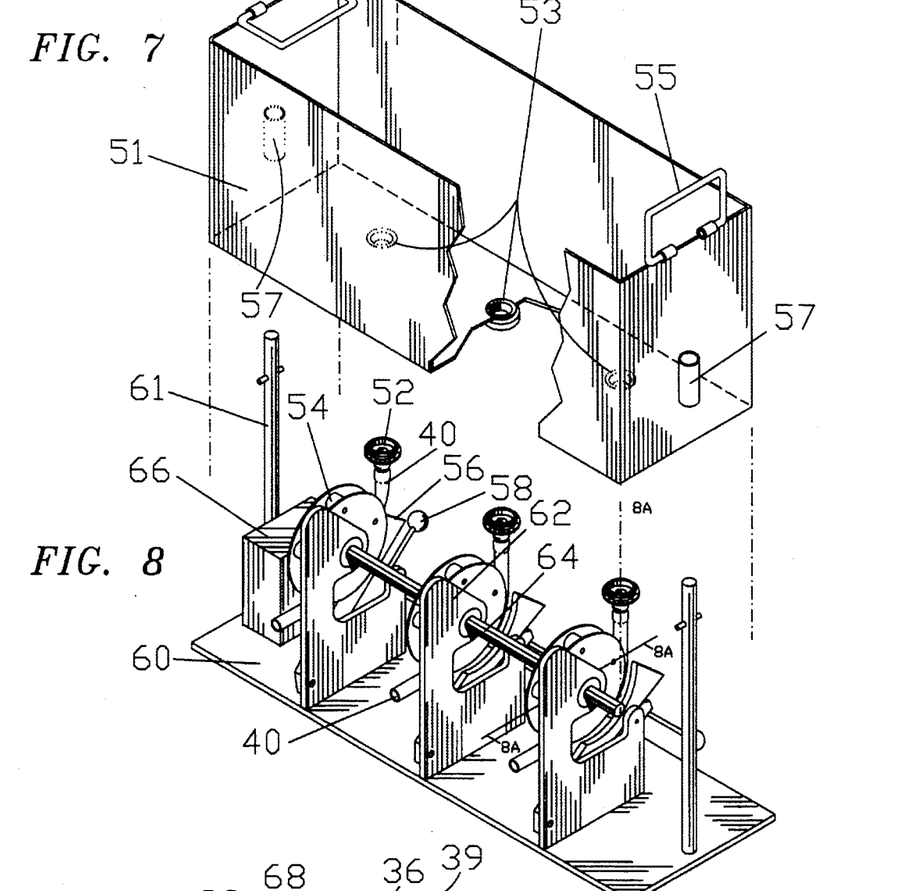
FIG. 7 is an isometric view of the liquid batter container and how it relates in position to the batter pump assembly.
FIG. 8 is an isometric view of the batter pump assembly.

FIG. 7 illustrates liquid batter mix storage container 51 having handles 55, support anchor sleeves 57 and showing three exit nipples 53 adapted to join easily with flexible rubber couplers 52. Liquid batter container 51 can be either metal or plastic. Vertical support posts 61 accurately couple with sleeves 57 to position the companion working parts.

FIG. 8 illustrates pump roller wheel 54. It is driven by gear motor 66. Cam 56 and cam lock lever 58 serve to provide a solid backing to flexible rubber tube 40 when roller wheel 54 presses on tube 40. When cam lock lever 58 is in the down position (as shown in FIG. 8) and unlocked, flexible rubber tube 40 can be removed. Electric motor 66 drives the pump roller wheel 54 a sufficient number of turns to dispense an accurate volume of liquid batter mix from tube 40 exit.

Figure 8A:
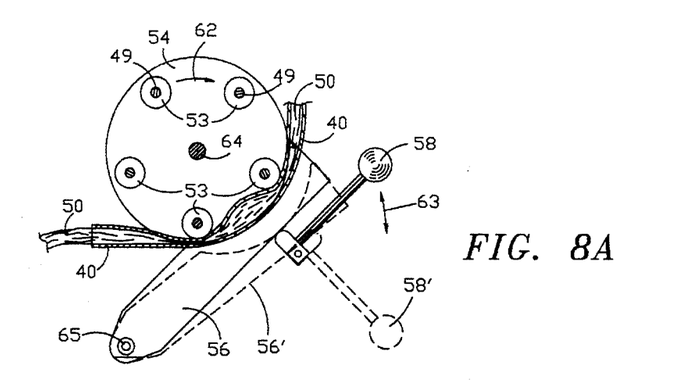
FIG. 8A is a cross-sectional view taken at 8A—8A of FIG. 8.

FIG. 8A shows the details of the mechanisms of FIG. 8 by way of a cross-section through pump roller wheel 54. Wheel 54 comprises two spaced walls holding a plurality (five shown here) of rollers 53 rotatable on their own shafts 49. The entire assembly of rollers 53 are mounted on shaft 64 turned by motor 66 (FIG. 8) in the direction of arrow 62. Rubber feed tube leading from container 51 to exit 40 is filled with liquid batter mix 50. Cam 56 has a concave surface which fits around the outside of tube 40 while rollers 53 travel in a path inside of tube 40. Cam 56 pivots about pin 65 as moved by handle 58. Handle 58 has an "up" position (solid lines) and a "down" position (dashed lines), both being set by hand. In the "up" position as shown in FIG. 8A, batter is squeezed out of tube 40 like from a toothpaste tube, when motor 66 rotates the roller wheel assembly 54 causing rollers 53 to squeeze tube 40 against cam 56. In the down position (cam 56' and handle 58') the face of the cam 56' does not impede flow through tube 40 which can be removed for cleaning.

Figure 9:
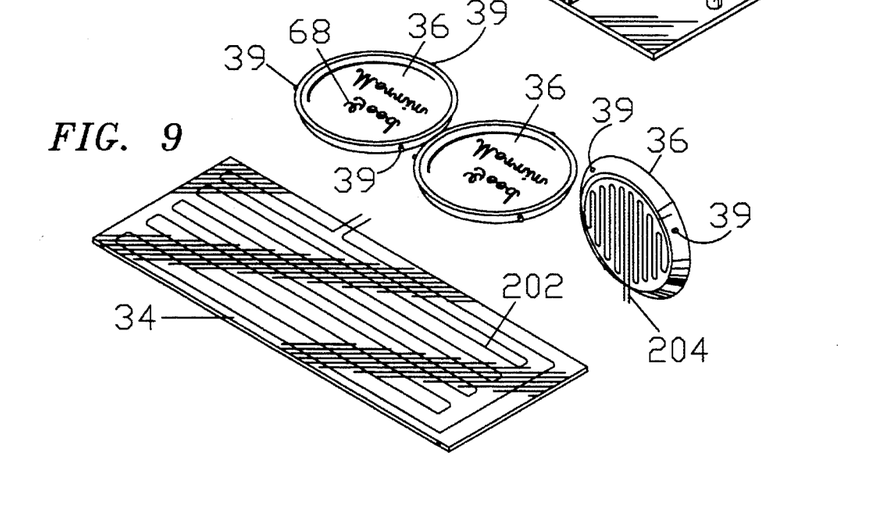
FIG. 9 shows the individual cooking surfaces and cooking dishes.

FIG. 9 illustrates a plurality of Teflon coated cooking dishes 36 having pins 39 equally spaced and extending outwardly at circumference edge to mate with recesses in anchor yoke 70. These Teflon coated cooking dishes 36 have an underside face containing electrical heating wires 204. Such electrical heating wires are similarly affixed to the underside of second cooking surface 34.

Figure 10:
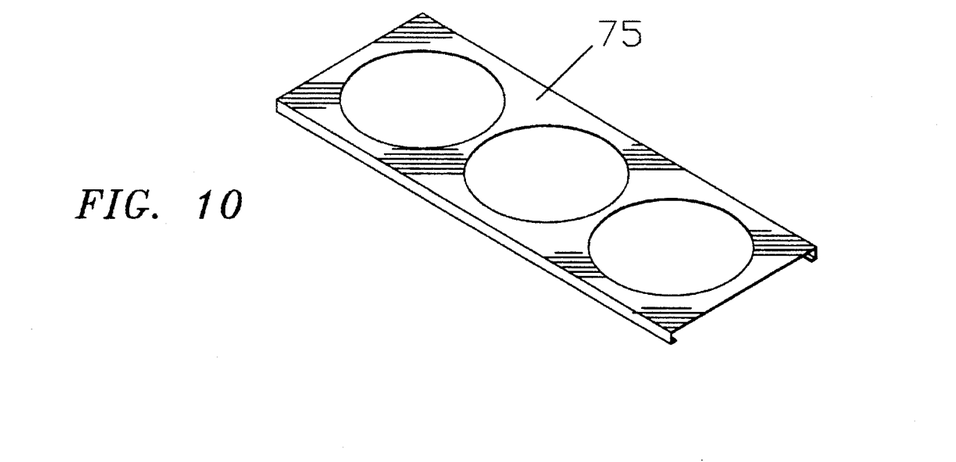
FIG. 10 shows the cover surrounding the cooking dishes.

FIG. 10 illustrates coverplate 75 which covers all open space between and around cooking dishes 36.

FIG. 11 shows two supporting framework assemblies 68 and 69 which, respectively, support first and second cooking surfaces 38 and 34. Assembly 68 includes two support brackets 76, each with a latch 73 to hold or release rectangular base 71 from brackets 76. Yoke 70 is a seat for each cooking dish 36. Two solenoids 78 operate the two latches 73 (see FIG. 12). Supporting framework assembly 69 includes two struts 32 attached to the underside of second cooking surface 34; two arms 72 and 72A; two support brackets 74; safety lock 77; two solenoids 78; and two latches 80 and 81. Latches 80 and 81 are identical to latches 73 (see FIG. 12) and are normally locked to hold second cooking surface 34 in a horizontal position, with unlocking being accomplished by operation of solenoids 78. The ends of arms 72 nearest to assembly 68 are rigidly connected to mainshaft assembly of FIG. 13, which is located along centerline 99 between assemblies 68 and 69. The connection between arm 72 and struts 32 includes a slot 83 to permit the tilting of second cooking surface 34 upward as shown in FIG. 6. Rotation safety lock 77 prevents second cooking surface 34 from swinging freely away from supporting framework assembly 69 when it passes the midpoint of its travel toward first cooking surface 38 for the pancake flipping step shortly after the position shown in FIG. 3. Gear motors 102 and 110 are shown in their respective operating positions.

Figures 12, 13:
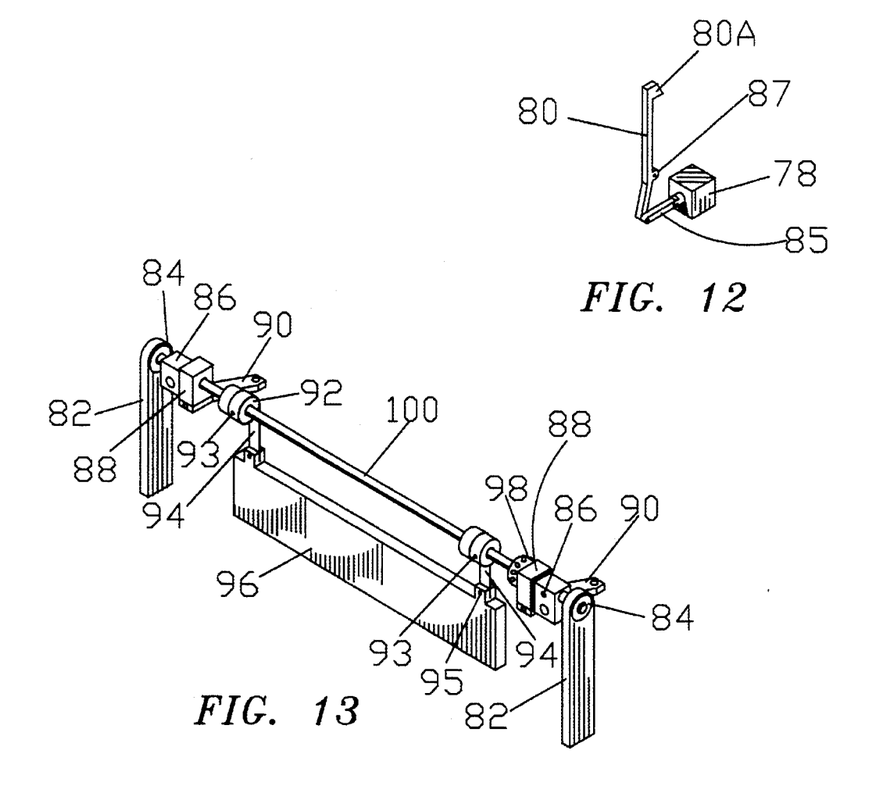
FIG. 12 is an isometric view of an electrically activated solenoid latch mechanism employed on latches of FIG. 11.
FIG. 13 is an isometric view of the shaft assembly and counter-weight mechanism, which joins the first and second cooking surfaces into an operating mechanism.

FIG. 12 shows the operation of latches 73, 80 and 81 by means of solenoids 78. Arm 80 lies against rectangular base 71 in the case of latches 80 and 81, with tab 87 bearing against an adjacent part of base 71 or strut 32. Latch tongue 80A is engaged in a recess or against a ledge when latch is closed. Solenoid 78 has its shaft 85 extended when the latch is closed. When the latch is to be opened or released, solenoid 78 retracts shaft 85 causing arm 80 to pivot about tab 87 and tongue 80 to release its catch.

FIG. 13 shows the mainshaft assembly which is connected to second cooking surface 34 and its supporting assembly 69, and provides the power to pivot the second cooking surface to pick up the cooking pancakes on the first cooking surface, perform the flipping operation and return the first cooking surface 38 and the supporting base 71 to its original horizontal position. This mainshaft assembly includes shaft 100, rotatably mounted in bearings 84 between support brackets 82, along centerline 99 of FIG. 11. Blocks 86 have recesses to receive the ends of arms 72 (see FIG. 11) and are fixed rigidly to shaft 100. Arms 90 rigidly connect first cooking surface 38 to blocks 88 which, in turn, rotate freely about shaft 100. Toothed spool 98 is also free to rotate about shaft 100 and is rigidly connected to its adjacent block 88, such that rotation of spool 98 will cause first cooking surface 38 to pivot about shaft 100. Weight 96 is connected to one end of belts or tapes 94 by pins 95. The other end of belts or tapes 94 are connected to windlass spools 92 by pins 93. Spools 92 are rigidly connected to shaft 100. The function of this assembly is to provide the force of a falling weight 96, when latches 80 and 81 are released to cause second cooking surface 34 to pivot toward first cooking surface 38 when it is time to flip the pancakes to the uncooked sides.

Figure 14:
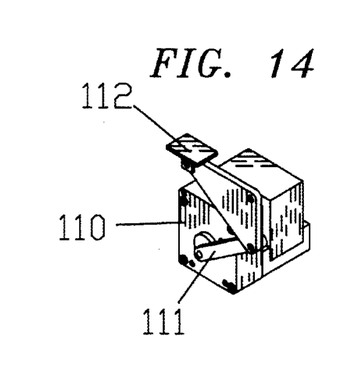
FIG. 14 is an isometric view of the second cooking surface assembly motor and its linkage employed to tilt the second cooking surface upward to discharge cooked pancakes.

FIG. 14 illustrates gearmotor 110, lever arm 111 and lifting pad 112 which cooperate by bringing pad 112 into contact with the underside face of second cooking surface assembly 34, and elevating it lengthwise to discharge three pancakes 37 as shown in FIG. 6. Gearmotor 110 and its linkages 111 and 112 are anchored onto baseplate 28.

Figure 15:
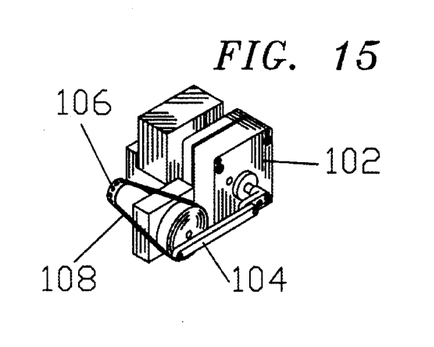
FIG. 15 is an isometric view of the drive motor and its linkage employed to pivot the first and second cooking surfaces.

FIG. 15 illustrates gearmotor 102, lever 104, driver belt 108 and perforated belt portion 106, when coupled with toothed spool 98 (see FIG. 13) act to rotate first cooking surface assembly 38 through a half-circle. The off-center position of lever 104 produces a reciprocating motion for belt portion 106, which in turn transfers that motion to first cooking surface 38.

Figure 16:
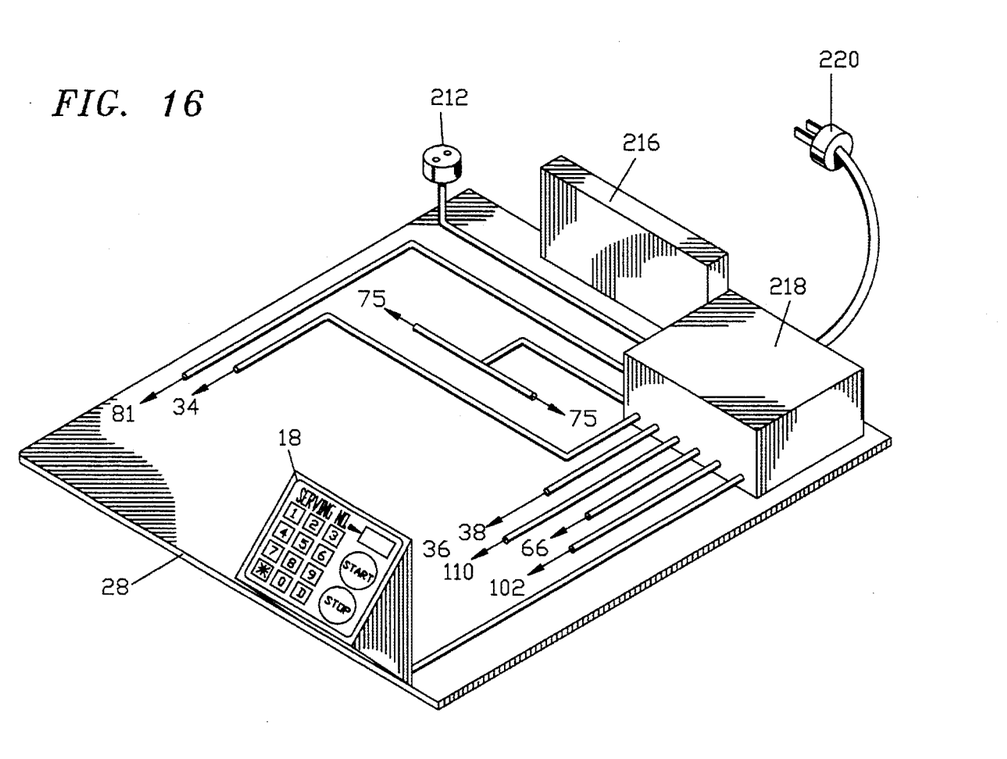
FIG. 16 is an isometric layout of the electrical wiring network of this pancake cooker.

FIG. 16 illustrates the electrical network to drive this invention. The entire system includes a power supply cord 220 to plug into a commercial outlet and wire routing to each associated component part in a standard electrical manner, including switches and mechanisms meeting all fire and safety code compliances. Since such equipment and practices are common and well understood, no attempt is made to show every detail thereof. A timer 216 and a programmer 218 are included to automatically release latches 73, 80 and 81, to heat cooking surfaces and turn them off; to flip pancakes over; to discharge cooked pancakes; to start and stop the feeding of batter to cooking dishes, and the like. A rigid plug 212 is provided to quick connect or disconnect the power to pump 66 (see FIG. 8).

The operation of this cooker proceeds generally as follows. Once a desired amount of liquid batter mix 50 has been liquefied for use, any amount up to fifty servings of three pancakes each can be stored in batter container 51. If the production location of said apparatus makes replenishment of batter difficult, housing 44 and container 51 can be separated from baseplate 28 by disengaging latches 160 and the replenishment operation conducted elsewhere. When on the other hand, there is need to replace flexible rubber tubes 40 or conduct general cleaning, disengaging latches 120 allows hopper 51 and housing 44 to be separated.

When container 51 has a desired amount of batter 50, the apparatus can be programmed for any number of servings, by pressing the appropriate buttons on console 18.

By pressing START pushbutton 16 the automated process begins with cooking dishes 36 rapidly brought to working temperature. Gearmotor 66 meters and dispenses accurate amounts of batter mix 50 through three flexible rubber tubes 40 directly onto three cooking dishes 36, simultaneously. By utilizing roller pump 54 rather than gravity feed, constant equal feed portions of batter 50 are readily obtained.

Approximately ten seconds before the three half-cooked pancakes are flipped and transferred to second cooking surface 34, it is brought to working temperature. At the required moment, latches 80 and 81 unlatch, allowing dead-weight 96 to lower itself and in so doing, to pivot second cooking surface 34 half-circle directly over and against the pancakes on the cooking dishes 36. Latches 73 are unlatched immediately and at the same time gearmotor 102 operates to pivot both cooking surfaces 34 and 38 and the half-cooked pancakes therebetween one half-circle in reverse. Second cooking surface assembly 34 now has three flipped half-cooked pancakes to rest on it in horizontal position, spring-loaded latches 80 and 81 having automatically relatched. Dead-weight 96 is now once again locked in a raised position. However, gearmotor 102 drives first cooking surface 38 to retrace its half-circle travel path and return to its original horizontal position and be automatically relatched by spring-loaded latches 73.

Since the apparatus was programmed to prepare multiple services, three portions of batter are again dispensed onto dishes 36 and the cooking cycle begins again.

After the finish cooking of the pancakes on second cooking surface 34 is completed, latch 81 unlatches, freeing the corresponding end of the second cooking surface 34. Almost simultaneously, gearmotor 110 brings its pad 112 into contact with the underside of second cooking surface 34 and elevates it angularly to such an extent that three fully cooked pancakes are discharged by sliding onto a dish or tray 59. After having done so, second cooking surface 34 is automatically relatched in place horizontally, and is ready to repeat its prior exercise of traveling half-circle to entrap, flip and transfer the next batch of half-cooked pancakes. A secondary spring-loaded latch means 77 companion part to arm 72, prevents second cooking surface assembly 34 from swinging like a door after reaching mid-point in its half-circle travel path as referenced in FIG. 3. From this point on, apparatus performance is repetitious until the programmed servings are completed.

Special function keys 22 and 24 may be programmed for special operations to assist in changing dishes 36 to another style; allowing hand dispensing of batter or the like.

Advantages of this invention include the use of printed circuit cards which can be easily removed and replaced, thus variations in cooking cycle times can be employed to accommodate special batters; baffleplate 42 and inner surface thermal insulation 41 eliminate the harmful effects of upward rising heat on the liquid batter mix 50; a plurality of separate and equal portions of liquid batter mix 50 are accurately and simultaneously dispensed; any suitable number of cooking dishes 36 can be used within the limits of space on cooking surface 38; inscribing of none, one, or all pancakes can be provided; easy access to component parts provides easy cleaning; conservation of energy is provided by automatically turning off consumption when not needed; total entrapment of half-cooked pancakes 37 during all flipping and transfer exercises is provided; and other suitable advantages are provided.

Another possible variation entails replacing the several cooking dishes 36 with one large rectangular shaped dish, to make a roll-up pancake. Still other variations include the preparation of waffles, omelets and the like. Because of its fully automated operational characteristics, the apparatus can be made to be coin operated.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An automated pancake maker having a continuous operating cycle comprising a first heated cooking surface including a plurality of heated pancake cooking dishes in an original horizontal position, a second heated cooking surface pivotably attached to said first cooking surface, a hopper for holding liquid pancake batter, means for automatically supplying a selected amount of said batter to each of said pancake dishes at a selected starting time, timed means for pivoting said second cooking surface from its original horizontal position onto the tops of cooking pancakes on said cooking dishes, means to lock said first cooking surface to said second cooking surface with said cooking pancakes between said two surfaces and to pivot said two surfaces reversely until said second cooking surface returns to its original horizontal position; means for unlocking said first cooking surface from said second cooking surface and pivoting said first cooking surface reversely to its original horizontal position and adapted to begin another said cycle; timed means for tilting said second cooking surface into an inclined plane to enhance removal of fully cooked pancakes therefrom, and means to return said second cooking surface to its original horizontal position ready to begin the next said cycle.

2. The pancake maker of claim 1 wherein said means for automatically supplying a selected amount of batter comprises a flexible rubber tubing extending from said container to an exit spaced above each said pancake dish, a cam surface selectively positionable against said rubber tubing adjacently upstream from said exit, a roller means to bear against said rubber tubing and said cam squeezing said rubber tubing therebetween, and a motor means to rotate said roller means against said tubing and thereby dispense said batter out said exit.

3. The pancake maker of claim 1 wherein said means for pivoting said second cooking surface to the tops of said cooking pancakes includes gravity causing an elevated weight to fall a given distance.

4. The pancake maker of claim 1 wherein said means to pivot both said cooking surfaces in a reverse direction to return said second cooking surface to its original horizontal position and to pivot said first cooking surface back to its original horizontal position includes a motor turning a sprocket wheel via a crank arm and said sprocket wheel driving a belt that pivots said first cooking surface.

5. The pancake maker of claim 1 wherein means for tilting said second cooking surface includes a motor with a lever arm assembly and a pad at the free end of said lever arm assembly, with said lever arm assembly adapted to extend said pad upwardly under one end of said second cooking surface.

* * * * *